Oct. 17, 1950     F. W. TURRETTINI     2,526,518
FRICTION REDUCING DEVICE FOR MACHINE TOOLS
Filed May 3, 1949     2 Sheets-Sheet 1
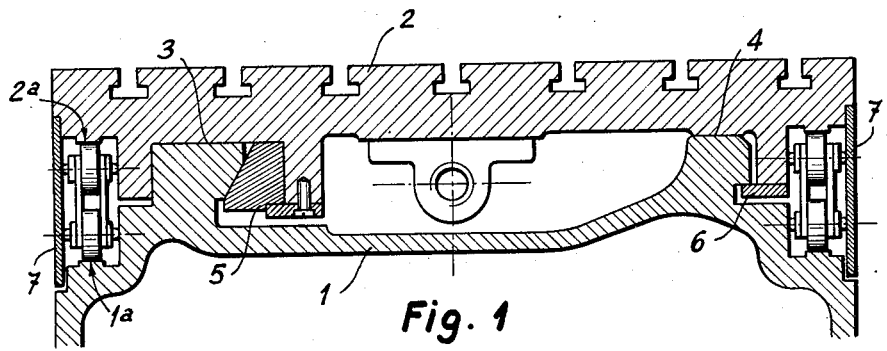
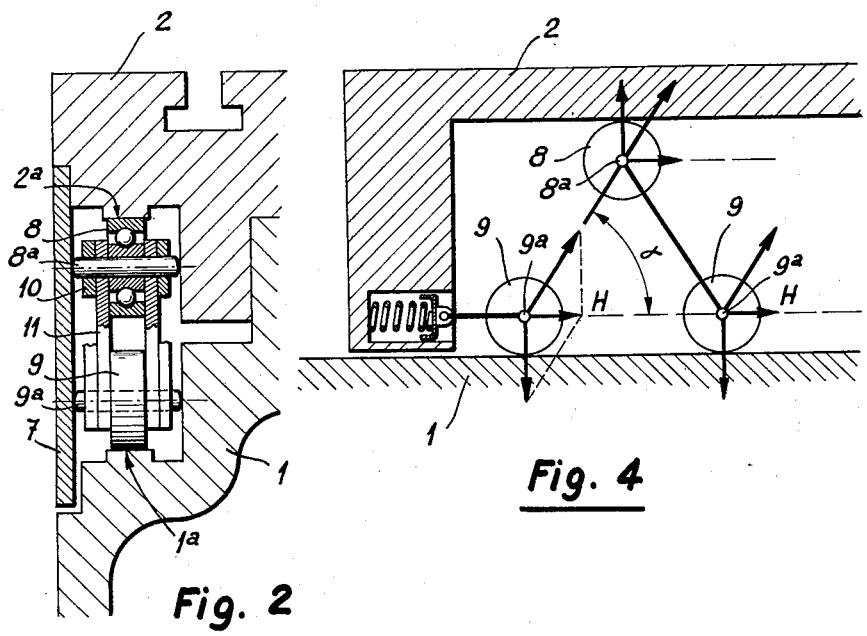
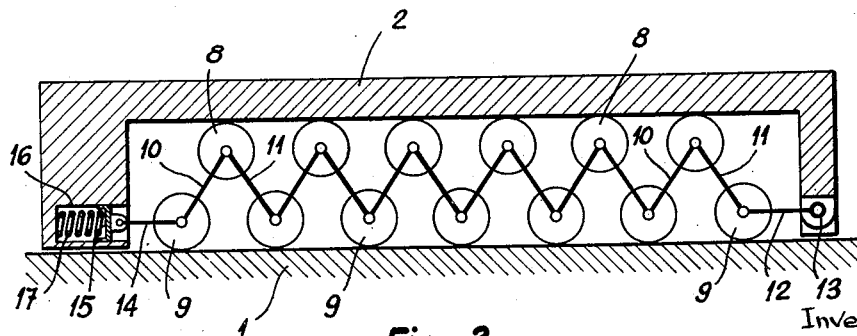
Inventor:
Fernand W. Turrettini
By Robert E. Burns
Attorney Oct. 17, 1950      F. W. TURRETTINI      2,526,518
FRICTION REDUCING DEVICE FOR MACHINE TOOLS
Filed May 3, 1949      2 Sheets-Sheet 2

Inventor:
Fernand W. Turrettini
By Robert E. Burns
Attorney

Patented Oct. 17, 1950

2,526,518

UNITED STATES PATENT OFFICE 2,526,518

FRICTION REDUCING DEVICE FOR MACHINE TOOLS

Fernand W. Turrettini, Bellevue-Geneva, Switzerland, assignor to Societe Genevoise d'Instruments de Physique, Geneva, Switzerland, a firm of Switzerland Application May 3, 1949, Serial No. 91,184
In Switzerland May 5, 1948

7 Claims. (Cl. 308—6)

The present invention relates to a friction reducing device for machines or machine tools with slide tracks.

In machine tools comprising a frame with one or more tracks and a slide or table movable over this track, high friction between the slide and the track is harmful because of rapid wear of the friction surfaces involved and furthermore, because the friction adversely affects the sensitivity desirable for movements of fine adjustment.

The lack of sensitivity is troublesome especially when the problem is, for example, to be able to bring the slidable table of a machine tool into strictly determined positions. The table is generally brought into the immediate vicinity of its final position by a motor driven control and then into the desired position by a manual fine adjustment control.

Owing to the difference existing between the static friction (at rest) and the dynamic friction (in movement), the resistance to be overcome by the manual control is not the same at the instant the table is set in motion and during the movement thereof, and the sudden diminution of this resistance after the movement has started causes an intermittent movement which makes fine and exact adjustment very difficult.

Various devices have been used to overcome this inconvenience. The table has been mounted on ball trains or movable roller bearings which roll between tracks provided on the lower face of the table and on the upper face of the frame. The result is excellent as far as reduction of friction and sensitivity of fine adjustment is concerned, but other inconveniences have come up, the guide arrangement being not reliable enough in case high forces transverse to the direction of movement occur.

Also relieving rollers, individually tensioned by springs, have been fastened to the table to absorb part of the weight thereof and to diminish its friction on the frame. This solution does not give satisfactory results as soon as there are heavy masses to be displaced, because the individual adjustment of the springs, of which the tension must adapt itself to greatly variable weights (weight of the table itself plus weight of the piece to be machined), is difficult to obtain and because the springs, to be strong enough, become very cumbersome.

An object of the present invention is to provide an effective friction reducing device for machines or machine tools with slide tracks, which overcomes the foregoing difficulties and disadvantages. Another object of my invention is to provide a device for relieving the track of a machine or machine tool of at least part of the weight of the slide moving on this track. A further object of my invention is to provide such a device which is easily adjustable to the weight of the slide. According to my invention the device comprises a row of spaced roller members adapted to roll on the frame of the machine in parallel to the track on this frame, and a row of spaced supporting members, for instance also rollers, situated above the row of first mentioned rollers and supporting the slide. The roller members and supporting members are positioned in such a way with respect to each other than they succeed each other alternately in the direction of the track forming the summits of juxtaposition triangles; the sides of these triangles connecting the members of the one row to the adjacent members of the other row consist of connecting rods articulated on the roller members and the supporting members. The two extreme members of this double row are engaged respectively by the slide and by a tensioning device which is mounted on the slide and is adapted to impart an inwardly directed force substantially in parallel to the track to the member it engages.

By adjusting the relatively small force exerted by the tensioning device, the supporting members are pressed with a smaller or greater force against the underside of the slide, supporting the same accordingly, while the roller members are carried by and may roll on the frame. The system of rods connecting the successive supporting and rolling members in zigzag fashion equally divide the existing forces over the various members, except for any forces transverse to the track which are met by the track itself.

Other objects and advantages of the present invention will appear from the following description and claims in conjunction with the accompanying drawings which illustrate by way of example embodiments of the invention.

In the drawings:

Figure 1 is a cross sectional view of a machine tool incorporating the device in accordance with my invention;

Figure 2 is a view on an enlarged scale of a portion of Figure 1;

Figure 3 is a side view partly in section and partly diagrammatically of Figure 1;

Figure 4 is a view on an enlarged scale of a portion of Figure 3, illustrating the working of the device;

Figure 5:
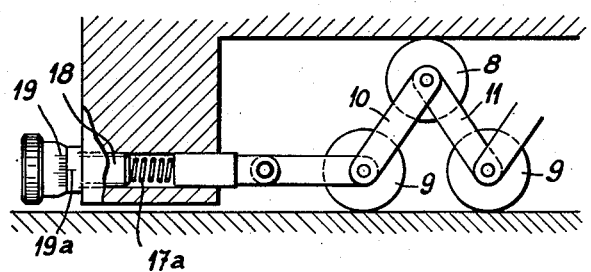
Figure 5 shows a modification of a detail of the device shown in Figures 1 to 4.

The machine tool represented in Figures 1 to 4 comprises a frame 1, on which is mounted a table 2 intended to carry the piece to be worked, sliding in a known manner on tracks 3 and 4 of the frame and retained by side plates 5 and 6. In accordance with the invention, the tracks 3 and 4 are relieved of the weight of the table by means of two identical devices located to the right and to the left of the frame in lateral seats limited by the frame 1 and the table 2 and closed by the side plates 7.

Each of these devices comprises (see in particular Figures 2 and 3) a train of rollers mounted on axles through the intermediary of ball bearings and distributed in two superposed rows, the upper row comprising six rollers 8 mounted on axles 8a and the lower row comprising seven rollers 9 mounted on axles 9a. As shown, the rollers 8 and 9 of the upper and lower row succeed each other alternately in the longitudinal direction of the track, each of the rollers 8 being positioned midway between its two neighboring rollers 9. Thus the axles 8a and 9a may be considered as forming the summits of juxtaposed isosceles triangles. Connecting rods 10 and 11 are pivoted on the axles 8a and 9a, forming the sides of these triangles and connecting the rollers of the one row to their neighboring rollers of the other row in zigzag fashion. The rollers 8 bear against a track 2a provided at the underside of the table 2, and the rollers 9 against a track 1a provided at the upper side of the frame 1 in parallel to the track 2a.

The extreme roller 9 to the right in Figure 3 is articulated by a rod 12 in a point 13 of the table, and the extreme roller 9 to the left in the same figure is articulated by a rod 14 at a piston 15 of a tensioning device, which piston slides in a cylinder 16 provided in the table 2 and is subject to the action of a spring 17, which constantly strives to move it out of the cylinder and toward the train of rollers. This action of the spring applies the rollers 8 against the table and the rollers 9 against the frame and maintains the entire system in equilibrium. Figure 4 shows the distribution of the forces. If H is the pressure exerted by the spring on the nearest roller, it will be seen that the following equality exists:

$$H = \frac{P}{n \cdot \tan \alpha}$$

where P is the weight of the table, n the number of rollers 9, and alpha the angle of inclination of the rods 10, 11 on the horizontal line. With a suitable selection of the number of rollers n and the angle α, a considerable relieving effect of the track with a small force H can be obtained. The rollers 8 are substantially static with respect to the table and do not roll on the track 2a thereof. They are provided only to prevent internal frictions in the articulated system which would tend to reduce the transmission of the pressure H progressively from one end of the train to the other. From this it follows that the rollers 8 may be substituted by supporting members bearing against the table, having any other convenient non-circular, circumferential form without departing from the scope of the invention. The rollers 9, on the other hand, roll on the track 2a of the frame 2 when the table is moved.

Figure 6:
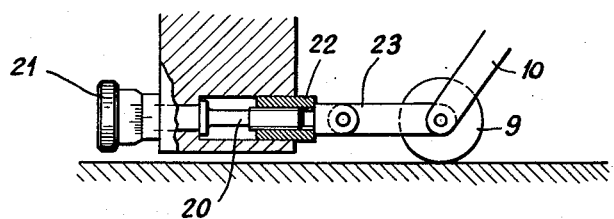
Figure 6 is another modification of the same detail of Figure 5.
Figure 7:
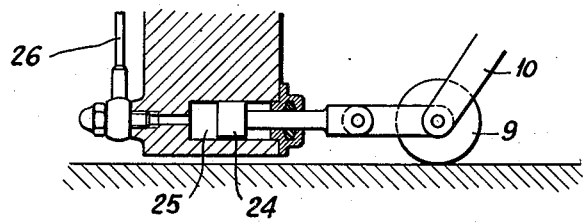
Figure 7 is yet another modification of the same detail of Figure 5.

Figures 5, 6 and 7 show variants of the above described tensioning device. In Figure 5 the tension of the spring 17a, acting on the piston 15a, is adjustable by means of a screw 18, the head of which is equipped with a graduation 19 cooperating with an index 19a of the table. In Figure 6, the tensioning device comprises a screw 20 rotatably but non-slidably mounted in the table and equipped with a graduated head 21. This screw engages and can displace, along its axis, a slidably mounted nut 22 articulated at the train of rollers by the rod 23. In Figure 7, the tensioning device comprises again a piston 24 slidable in a cylinder 25 provided in the table 2 and articulated on the train of rollers but this piston is controlled by a hydraulic system connected by the pipeline 26 with the cylinder and producing an adjustable pressure in the latter.

Figure 8:
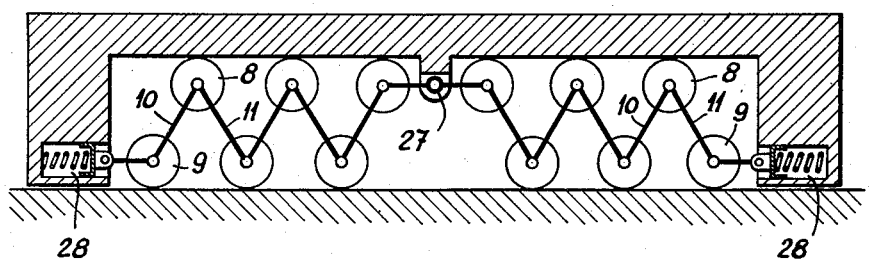
Figure 8 is a side view corresponding to Figure 3 of another embodiment of the invention.

The embodiment of Figure 8 shows a friction reducing device comprising two trains of rollers positioned symmetrically with respect to a plane through the middle of the table and perpendicular to the track, these two trains of rollers thereby allowing equal adjusting forces in the two directions of movement of the table. To this effect two rollers in the upper row at the adjacent inner ends of the two trains are articulated on the middle of the slide at 27, while the rollers at the two outer ends of the trains are connected with two tensioning devices 28 mounted on the table at both sides thereof and imparting opposed inwardly directed forces to the roller trains.

What I claim and desire to secure by Letters Patent is:

1. In a machine having a frame provided with at least one track and having a slide movable along said track, a device for relieving said track of at least part of the weight of said slide, said device comprising at least one row of spaced roller members carried on said frame for rolling movement in parallel to said track, a number of spaced supporting members situated in an alternate row above said row of rolling members and bearing against the underside of said slide, a plurality of connecting rods each extending between a roller member and a neighboring supporting member and pivoted to said members, said connecting rods thus inter-connecting said successive roller members and supporting members in zigzag fashion, at least one tensioning device mounted on said slide and engaging the extreme member at one end of said double row of roller members and supporting members for imparting to said extreme member an inwardly directed force substantially in parallel to said track thereby to press said supporting members upwardly against said slide, the extreme member at the other end of said double row being connected to a fixed point of said slide in opposition to the force of said tensioning device.

2. In a machine having a frame provided with at least one track and having a slide movable along said track, a device for relieving said track of at least part of the weight of said slide, said device comprising at least one train of spaced rollers rotatably mounted on axles and situated alternately in one or the other of two superposed parallel rows, the rollers in the lower of said two rows carried on said frame for rolling movement in parallel to said track, and the rollers in the upper row bearing against the underside of said slide, a plurality of connecting rods each extending between two neighboring rollers of the upper and of the lower row and articulated on the axles thereof, said connecting rods thus inter-connecting the successive rollers of said train of rollers in zigzag fashion, forming the sides of a number of juxtaposed isosceles triangles of which the roller axles form the summits, a tensioning device mounted on said slide adjacent one end of said train of rollers and connected to the axle of the extreme roller at that end for imparting to said train an inwardly directed force substantially in parallel to said track, the axle of the extreme roller at the other end of said train being connected to a fixed point of said slide.

3. In a machine having a frame provided with at least one track and having a slide movable along said track, a device for relieving said track of at least part of the weight of said slide, said device comprising at least one train of spaced rollers rotatably mounted on axles and situated alternately in one or the other of two superposed parallel rows, the rollers in the lower of said two rows carried on said frame for rolling movement in parallel to said track, and the rollers in the upper row bearing against the underside of said slide, a plurality of connecting rods each extending between two neighboring rollers of the upper and of the lower row and articulated on the axles thereof, said connecting rods thus inter-connecting the successive rollers of said train of rollers in zigzag fashion, forming the sides of a number of juxtaposed isosceles triangles of which the roller axles form the summits, a tensioning device mounted on said slide adjacent one end of said train of rollers and comprising a slidably mounted piston and an adjustable spring acting on said piston, said piston being connected to the axle of the extreme roller at that end for imparting to said train an inwardly directed force substantially in parallel to said track, the axle of the extreme roller at the other end of said train being connected to a fixed point of said slide.

4. In a machine having a frame provided with at least one track and having a slide movable along said track, a device for relieving said track of at least part of the weight of said slide, said device comprising at least one train of spaced rollers rotatably mounted on axles and situated alternately in one or the other of two superposed parallel rows, the rollers in the lower of said two rows carried on said frame for rolling movement in parallel to said track, and the rollers in the upper row bearing against the underside of said slide, a plurality of connecting rods each extending between two neighboring rollers of the upper and of the lower row and articulated on the axles thereof, said connecting rods thus interconnecting the successive rollers of said train of rollers in zigzag fashion, forming the sides of a number of juxtaposed isosceles triangles of which the roller axles form the summits, a tensioning device mounted on said slide adjacent one end of said train of rollers and comprising an adjustable, rotatably mounted screw member and a slidably mounted nut member threadedly engaging said screw member, said nut member being connected to the axle of the extreme roller at said train end for imparting to said train an inwardly directed force substantially in parallel to said track, the axle of the extreme roller at the other end of said train being connected to a fixed point of said slide.

5. In a machine having a frame provided with at least one track and having a slide movable along said track, a device for relieving said track of at least part of the weight of said slide, said device comprising at least one train of spaced rollers rotatably mounted on axles and situated alternately in one or the other of two superposed parallel rows, the rollers in the lower of said two rows carried on said frame for rolling movement in parallel to said track, and the rollers in the upper row bearing against the underside of said slide, a plurality of connecting rods each extending between two neighboring rollers of the upper and of the lower row and articulated on the axles thereof, said connecting rods thus inter-connecting the successive rollers of said train of rollers in zigzag fashion, forming the sides of a number of juxtaposed isosceles triangles of which the roller axles form the summits, a tensioning device mounted on said slide adjacent one end of said train of rollers and comprising a cylinder, a piston slidably mounted therein, and a hydraulic system connected to said cylinder and sustaining pressure therein, the other side of said piston being connected to the axle of the extreme roller at said train end for imparting to said train an inwardly directed force substantially in parallel to said track, the axle of the extreme roller at the other end of said train being connected to a fixed point of said slide.

6. In a machine having a frame provided with at least one track and having a slide movable along said track, a device for relieving said track of at least part of the weight of said slide, said device comprising two trains of spaced rollers placed end to end in a line in parallel to said track, the rollers of each of said trains being situated alternately in one or the other of two superposed parallel rows, the rollers in the lower of said two rows carried on said frame for rolling movement in parallel to said track, and the rollers of the upper row bearing against the underside of said slide, a plurality of connecting rods, each extending between two neighboring rollers of the upper and the lower row and articulated thereon, said connecting rods thus connecting the successive rollers of each of said two trains of rollers in zigzag fashion, two tensioning devices mounted on said slide adjacent the two outer ends of said two trains of rollers and engaging the extreme rollers at those ends for imparting thereto inwardly directed forces substantially in parallel to said track, the two rollers at the adjacent inner ends of said two trains of rollers being connected to the middle of said slide.

7. A friction reducing device for machine tools having a frame with at least one slide track and a slide movable along said track, said device comprising opposed parallel roller tracks on said frame and on the underside of said slide respectively, at least one train of spaced rollers situated alternately in one of the other of superposed parallel rows, the upper row of said rows bearing against said roller track on said slide and the lower row bearing against the said roller track on said frame for rolling movement in parallel to said slide track, said rollers being rotatably mounted on axles, a plurality of connecting rods of equal length, each extending between two neighboring rollers of the upper and of the lower row and pivoted on said axles, said connecting rods thus connecting the successive rollers of said train of rollers in zigzag fashion, a tensioning device mounted at one end of said slide adjacent one end of said train of rollers for imparting thereto an inwardly directed force substantially in parallel to said tracks, a rod connecting the axle of the extreme roller at said end of said train to said tensioning device, and a rod connecting the axle of the extreme roller on the other end of said train to said slide.

FERNAND W. TURRETTINI.

REFERENCES CITED

The following references are of record in the file of this patent:

UNITED STATES PATENTS

| Number | Name | Date |
| --- | --- | --- |
| 1,381,188 | Gury | June 14, 1921 |
| 1,926,828 | Van Berkel | Sept. 12, 1933 |
| 2,045,464 | Harley | June 23, 1936 |
| 2,244,434 | Shaw | June 3, 1941 |